April 6, 1965            G. S. FRANK            3,176,577

VISUAL COLOR COMPARATOR HAVING A ROTATABLE COLOR KEYED STANDARD

Filed May 2, 1962            2 Sheets-Sheet 1

GOMER S. FRANK
INVENTOR

BY R. E. Geauque
Attorney

April 6, 1965 G. S. FRANK 3,176,577
VISUAL COLOR COMPARATOR HAVING A ROTATABLE COLOR KEYED STANDARD
Filed May 2, 1962 2 Sheets-Sheet 2
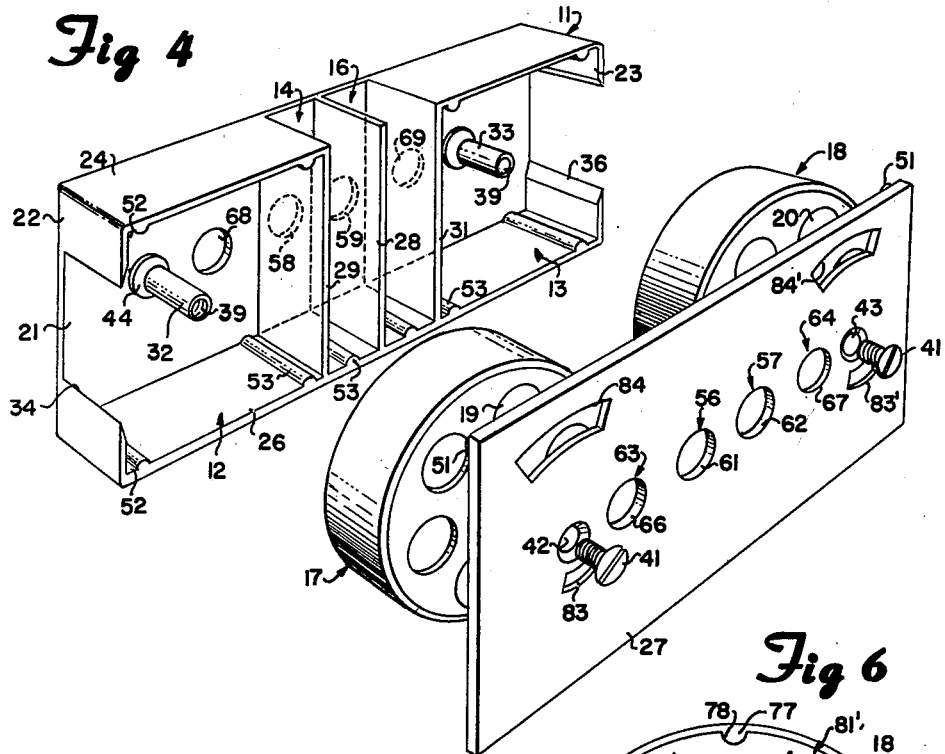
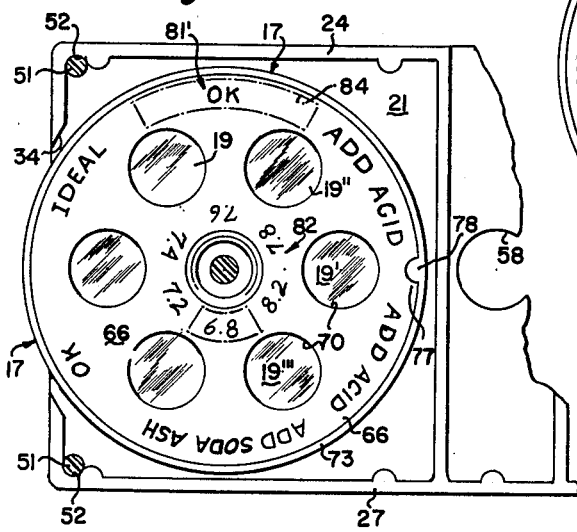
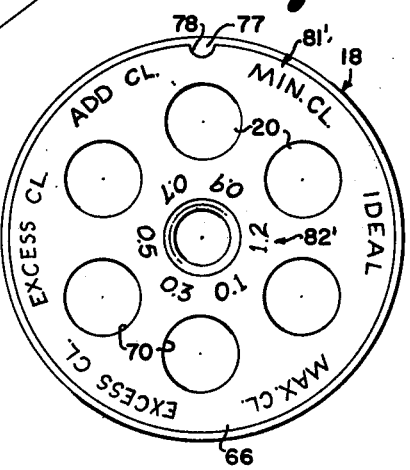
GOMER S. FRANK
INVENTOR.
BY R.E. Grangue
Attorney

United States Patent Office 3,176,577
Patented Apr. 6, 1965

3,176,577
VISUAL COLOR COMPARATOR HAVING A
ROTATABLE COLOR KEYED STANDARD
Gomer S. Frank, 16311 Bircher St., Granada Hills, Calif.
Filed May 2, 1962, Ser. No. 191,939
2 Claims. (Cl. 88—14)

This invention relates to a color comparator and more particularly to a device for testing liquids by comparing the value of the color of a liquid to graduated standard colors of known values so as to more readily and accurately ascertain the medical and/or chemical content of the liquid.

This invention is anticipated as being most practicable and useful in its preferred form herein disclosed for conducting tests by comparison of a color of a liquid to color standards so as to conduct one or more predetermined tests such as to determine the chlorine and/or pH values of water of a swimming pool, or the like. It is to be understood, however, that the comparator of this invention, as herein illustrated and described, may be used for varied, other purposes, such as testing the chemical composition of various other types of liquids or medicines for medical or chemical investigation of the liquids by comparison of the color of the liquid to be tested, when mixed with various appropriate reagents reactive with the liquid to produce various colors identified by color standards corresponding to the values of the type of test to be conducted.

Although various similar devices have been suggested and produced in the past for similar use, such devices have primarily included color standards comprising a plurality of stained color samples of glass or other breakable material which are subject to fading, breakage and for which no provision has been made for practicably replacing or changing the color samples so as to more adapt the device for other uses or tests than for which it was originally intended. It has been found, for example, that the standards for particular liquids may vary considerably in different communities and under differing regulations a color standard provided for testing particular liquids in one community is not necessarily suitable or acceptable for comparison with like liquids in other communities. Therefore, in such event, a device acceptable and useable under one circumstance may not be useable elsewhere whereby an entire device must be substituted therefor, or the color wheel replaced so as to provide a device in which its color wheel provides color keys of color standards which are acceptable and useable.

Also, in the past, color comparators have been provided with color standards suitable for only one type of test and in order that another type of test may be conducted with the device, either a plurality of devices must be provided each suitable for a particular test or a plurality of sets of color standards fixed in interchanged color must be provided which are time-consuming and impracticable to change. Furthermore, even if the entire device or subassemblies thereof are replaced, there may still exist the problem of correcting the color standards so as to be acceptable and useable under varying requirements.

This invention, on the other hand, provides a new and improved color comparator which is adaptable for use in one or more color comparison tests by providing at least one, and preferably, a plurality of color wheels, each having a plurality of color keys positionable so as to be observed for comparison with the liquid to be tested. The liquid is most practicably supported in juxtaposition to the color keys and observable simultaneously therewith so that an instant and accurate comparison can be made of the liquid relative to the color keys. This invention further provides improved color keys which are in liquid form and contained within unbreakable, replaceable containers removably supported within the color wheels so as to more advantageously permit removal and replacement of the color keys relative to the individual color wheels. In accordance with this invention, the colored liquid samples are contained within unbreakable containers of transparent, high impact material which are sealed and which substantially reduce or eliminate breakage normally experienced with color keys of similar devices intended to accomplish similar purposes.

The color keys may be readily and quickly removed and replaced by color keys of varying colors suitable for predetermined tests or for use under varying regulations not common to all uses anticipated therefor.

This invention provides observation openings extending through a casting of light-excluding material for facilitating viewing of the color keys simultaneously with the liquid to be tested for comparison thereof to the color keys. This invention additionally provides additional observation openings extending through the casing for simultaneously observing discrete indicia observable when a color key is aligned to correspond with the color of the liquid being tested for indicating the condition (in numerical values) and instructions for correcting such conditions.

It is therefore an object of this invention to provide a new and improved color comparator having a walled casing of light-excluding material adapted for either single or multiple testing of liquids in which color keys corresponding to color standards of known values are easily and readily comparable to a liquid to be tested.

Another object of this invention is to provide a new and improved color comparator which provides means for supporting a plurality of liquids corresponding to the number of sets of color standards provided for comparison therewith.

A further object of this invention is to provide a new and improved color comparator which quickly and readily visibly indicates the condition of the liquid to be tested when a color key most nearly matching the color of the liquid is aligned therewith.

Another object of this invention is to provide indicia means for visibly indicating instructions for correcting a condition of the fluid being tested in the event that the condition is not acceptable according to predetermined standards.

An important object of this invention is to provide a new and improved color comparator of the character described in which the color keys are in the form of liquid contained in removable and replaceable containers, the liquids being provided in standard colors of known values.

Yet another object of this invention is to provide a new and improved color comparator of the character described which is economical to manufacture and is capable of mass production.

A general object of this invention is to provide a new and improved color comparator of the character described which overcomes disadvantages of prior means and methods heretofore intended to accomplish generally similar purposes.

These and other objects of this invention will be more apparent from reference to the following drawings, detailed description and appended claims.

In the drawings:

FIGURE 4 is a perspective view, in elevation, of the preferred embodiment of the color comparator of this invention, with component parts thereof shown in exploded relationship;

FIGURE 5 is a front side view, in elevation, of the left end of the color comparator of FIGURE 1, with a front cover thereof removed for greater clarity;

FIGURE 6 is a front side view of another color wheel of the comparator of FIGURE 1, illustrating the wheel in greater detail.

Figure 1:
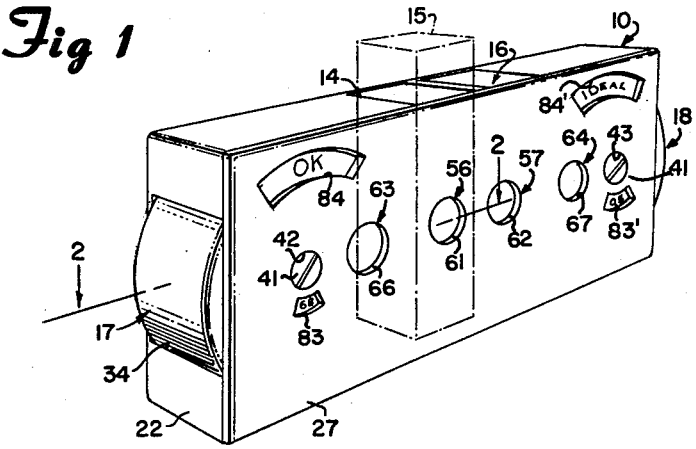
FIGURE 1 is a perspective view, in elevation, of a preferred embodiment of the color comparator of this invention.
Figure 2:
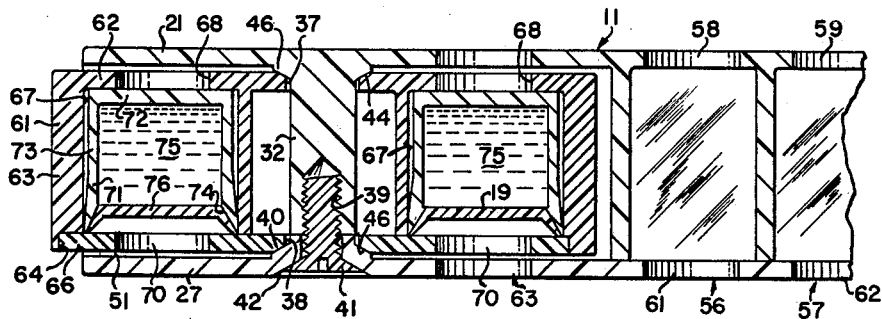
FIGURE 2 is an enlarged, fragmentary, horizontal cross-sectional view as viewed substantially along the line 2—2 of FIGURE 1.

Referring in detail to the drawings, and more particularly to FIGURES 1–6, there is shown by way of illustration, but not of limitation, a preferred embodiment of a color comparator designed and constructed in accordance with this invention and generally referred to by the numeral 10. In general, the device 10 includes a walled casing 11 of light-excluding material, such as a translucent or opaque, high-impact polystyrene plastics material, or the equivalent, having a pair of spaced compartments 12 and 13 separated by relatively narrower, vertical compartments 14 and 16 adapted to support liquid containers designated by the numeral 15 and illustrated in broken lines in FIGURE 1 so as to juxtapose the liquid in the container to a pair of opposed cylinders on color wheels 17 and 18, each having a plurality of preselected color keys 19 and 20, respectively, of known values for comparing the color keys to the color of the solution contained within the container 17 for determining the condition of the solution.

The casing 11 is preferably, but not necessarily, of rectilinear configuration and includes vertical back and end walls 21, 22 and 23, respectively, horizontal top and bottom walls 24 and 26, respectively, and a detachable vertical front wall 27. A plurality of vertical partitions are provided for dividing the casing into the discrete, vertical compartments 12, 13, 14 and 16, the partitions including a center most partition 28 and a pair of partitions 29 and 31 spaced laterally therefrom. The top wall 24 is interrupted so as to provide openings at the top of the compartments 14 and 16 through which the containers like 15 may be readily inserted to reside in the compartments.

A pair of horizontal posts 32 and 33 extend substantially centrally through the compartments 12 and 13, respectively, to rotatably mount the color wheels 17 and 18, respectively, and to provide means to which the front wall 27 may be detachably secured.

Figure 3:
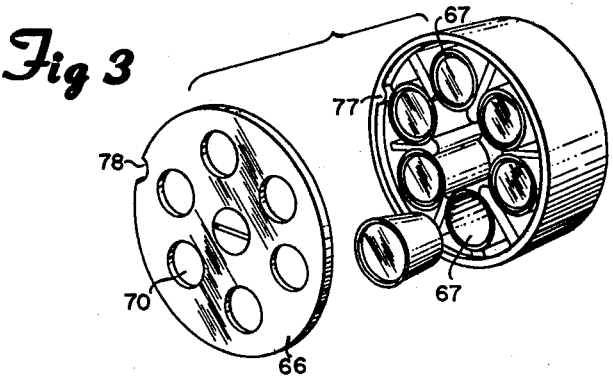
FIGURE 3 is a perspective view, in elevation, of a color wheel included in the color comparator of this invention with component parts thereof illustrated in exploded relationship.

The posts 32 and 33 are preferably formed eccentrically relative to the compartments 12 and 13 so as to mount the color wheels 17 and 18 eccentrically relative thereto, whereby a portion of the outer periphery of each wheel extends outwardly of its respective compartment as best seen in FIGURES 1, 3 and 5, through cut-outs 34 and 36, respectively. In this manner, the wheels may be readily engaged by a finger of the user for easily and readily rotating a wheel for a purpose to be hereinafter described.

Each post 32 and 33 preferably has a relatively smooth cylindrical exterior surface rotatably fitting aligned axial apertures 37 and 38 of each color wheel 17 and 18 so as to rotatably support the wheel. An internally threaded bore 39 is provided in each post for engagement by screws or other fastening means 41 extending therein and through laterally spaced apertures 42 and 43, respectively, extending through the front wall 27. The posts 32 and 33 each preferably include a frusto-conical base 44 complementary to a counter sunk face 46 of each of the apertures 37 and 38. The wall 27 includes a pair of inwardly-extending frusto-conical bosses 48 formed on the interior surface of the wall and surrounding the apertures 42 and 43. The bosses 48 are each aligned with a base 44. Each fastener 41 extends through a boss 48 and its respective posts 32 or 33.

The front wall 27 is held against lateral movement relative to the compartmentalized portion of the casing 11 by pins 51 formed adjacent to the corners of the casing and extending inwardly to nest with the complementary corners 52 of the said casing portion. In this manner, the front wall 27 is held from lateral movement while the screws 41 are inserted to detachably secure the wall 27 to the posts 32 and 33. A plurality of lateral ribs 53 are preferably provided to stiffen the various walls of the casing.

A pair of first observation openings 56 and 57 are provided, one for each of the relatively-narrow, vertical compartments 14 and 16 so as to facilitate observation of the liquid contained in a container 15 supported therein. Each of the observation openings 56 and 57 includes an aperture 58 and 59, respectively, extending through the back wall 21 and apertures 61 and 62, respectively, provided in the front wall 27 and aligned therewith, the apertures 61 and 62 enabling viewing of the liquid within the container 17 whereas the apertures 58 and 59 permit illumination of the compartments 14 and 16.

Second observation openings 63 and 64 are radially spaced from the pivot points of the color wheel 17 and spaced complementary to the radial distance of the centers of the color keys 19 from the pivots for facilitating observation of the color keys. The observation openings 63 and 64 include apertures 66 and 67, respectively, extending through the front wall 27 and apertures 68 and 69 aligned therewith and extending through the back wall 21, the apertures being substantially equal in size. In this manner, when the color wheels 17 and 18 are rotated for a purpose to be hereinafter described, the color keys 19 may be observed through the observation openings 63 and 64 for comparison to the liquid observed through the observation openings 56 and 57, respectively. The color keys are illuminated by the light entering through apertures 66 and 67.

The color wheels 17 and 18 are identical with the exceptions noted hereinafter and each supports a plurality of color keys which are circumferentially arranged on and radially spaced from the axes of rotation, i.e., posts 32 and 33 a distance equal to the radial distance of the observation openings 63 and 64 from the respective axes of rotation.

As best seen in FIGURES 2, 3, 5, and 6, each wheel 17 and 18 includes a cylindrical body 61, preferably formed of a light-excluding material, similar to the material of the casing 11 and its cover 27. The body is cup-shaped, having a rear wall 62 and an annular wall 63 integral therewith. The annular wall 63 is formed with an annular recess 64 adjacent to its open front end for detachably receiving a circular front wall 66. The rear wall 62 contains the aperture 37 extending centrally therethrough whereas the front wall 66 is formed with the aperture 38 aligned with the aperture 37 and through which the posts 32 and 33 extend as previously described. A plurality of circumferentially spaced socket members 67 are integrally, or otherwise, formed in the body 61 to communicate with an equal plurality of apertures 68 extending through the rear wall 62.

In accordance with this invention, the color keys 19 and 20 comprise liquid containers each removably disposed in one of the sockets 67 and filled with a liquid 75 suitably colored by a color fast dye, or the like, of a preselected color. Each liquid container preferably includes a cup-shaped body 71 having a bottom wall 72 and an annular wall 73 intergral therewith to define an open end 74 which is closed by a closure member 76 cemented or otherwise secured to close the open end. The body 71 and closure member 76 are preferably formed of an unbreakable and transparent plastics material, such as high-impact polyethylene, or the equivalent, through which the color of the liquid 75 contained therein is readily observable when its respective color wheel 17 and 18 is rotated to align the color key with its observation opening, 63 or 64, respectively. By such construction, if it is desired to replace one of the color keys, is color wheel is released from the casing 11 by removal of the front plate 27 afterwhich the color wheel is readily removed from its respective post 32 and 33. Subsequently, the front removable wall 66 of its wheel is removable to expose the color keys and any color keys to be replaced are then removed. Other keys of suitable colors are then easily and readily inserted to replace selective of the color keys in selective of said color wheels.

The cover plate 66 is preferably keyed to the annular wall 73 by a key 77 complementary to and fitting in a notch 78 formed in the wall 66 so as to accurately align the openings 70 extending therethrough the front wall 66 with the apertures 68 of the back wall 62 and so that the color keys are readily observable when aligned with their respective observation openings 66 or 67.

Although the casing 11 is shown as having its front wall removable, and described as being formed of an opaque or translucent material, it is to be understood that the casing may be constructed so that the rear wall 21 is removable instead. Furthermore, the density of the material is preferably opaque sufficiently to prevent bleeding of the color of one key to another.

As will now be more clearly understood by the foregoing description, each compartment 12 and 13 is provided with a color wheel 17 and 18, respectively, rotatable therein, the color wheels each having, removably residing in its sockets 67, a plurality of color keys comprising transparent containers 73 filled with liquid 75 of a predetermined color and variation of color representing selective known values of the composition of the liquid being tested. For example, in the event that tests are to be conducted on a liquid, such as on the water in a swimming pool, or the like, to determine the alkiline or chlorine content of the water the color keys are colored in selective of colors normally associated with such pH or chlorine tests, with each wheel having a set of color keys corresponding to the test to be conducted therewith. In these particular tests, the color keys vary, in one wheel, from an almost-white to a relatively-intense yellow, for testing for chlorine content. A suitable range of colors useful for determining the pH value of the pool water is then provided for the color keys of the other color wheel.

In use, a quantity of water from the swimming pool is initially placed in a container 15 to a depth sufficient to extend above the observation opening 57 so as to be readily viewed therethrough and in a predetermined, measured quantity. A predetermined quantity of a reagent solution, such as Ortho-tolidin solution, is then mixed with the water to react therewith, such a mixture reacting to produce, in accordance with the percentage of chlorine in the water, a certain color. The color wheel, for example the wheel 18, having color keys 20 varied in degrees of yellow color, is then rotated by the engagement of a finger with the periphery thereof extending through the slot 36 until a color key 20 most nearly corresponding to the color of the solution having the reagent, and having a known value, is aligned with the observation opening 64 where the solution to be tested may be compared to the color key of known value. In this manner, the percentage of chlorine in the water sample can be easily and readily determined by progressive comparison of the water to the color keys.

Swimming pool water is usually tested for both acidity (or alkaline) and chlorine in accordance with civic regulations. For this purpose, the casing 11 includes a pair of compartments for supporting a pair of containers 15, each containing a predetermined quantity of the liquid to be tested and each liquid having a different reagent mixed therewith for conducting different tests determinable by comparison with the color wheels 17 and 18.

In accordance with this invention, discrete indicia means, generally referred to by the numerals 81 and 82 are circumferentially and diametrically arranged on the exterior surface of the outer walls 66 of the wheels 17 and 18 for indicating the condition of the water when matched to the color keys.

The color wheel 17, in this manner, can be advantageously used for testing the liquid to determine its pH value so as to determine the acidity (or alkalinity) thereof, while tested for its chlorine content by means of the wheel 18. For this purpose, the wheel 17 is provided with color keys of a range of suitable colors. A container 15, having the liquid to be tested, is inserted into the compartment 14 so that the liquid (mixed with a suitable pH reagent, such as phenol-red) is observable through the observation opening 56. The color wheel 17 is then rotated by manual engagement of the periphery of the wheel through the slot 34 until a color key 19, most nearly matching the color of the solution to be tested, is aligned with the observation opening 63 so as to be observed therethrough for comparison to the color of the liquid. When the liquid has been matched by a color key 19 most nearly corresponding to the color of the liquid viewed through the observation opening 56, it will be noted that a pH value, six herein being shown, for example, and ranging from 6.8 to 8.2, is visible through an arcuate opening 83 extending through the front wall 27 of the casing. Simultaneously, an instruction of the indicia 81 is registered to be visible through a diametrically opposed arcuate opening 84 likewise extending through the front wall 27 of the casing.

Therefore, if the color of the liquid being tested falls within an acceptable range, between, for example, values ranging from 6.8 to 7.4, one index of the indicia 81 registers with the opening 84 so as to indicate this acceptable condition. There are preferably two end indices indicating "OK" or acceptable and an index therebetween indicating "Ideal" whereby the liquid is thereby known to be acceptable when either of the color keys 19', 19" or 19''' are aligned with the observation opening 63 to be compared to the color of the liquid. In the event that a color key 19 other than the acceptable color keys are aligned with the observation openings 63, one of the other indices of the indicia is observable through the opening 84 to give appropriate instructions, such as "add acid" or "add soda ash," thereby automatically indicating the proper correction to be made in the event that the pH value of the solution is unacceptable.

The color wheel 18 is similarly provided with circumferentially arranged indicia 81' having instruction legends for indicating the proper action to be taken relative to the chlorine content of the liquid, to be tested and a second indicia means 82' indicating the numerical value of the chlorine content of the liquid being tested. Such indicia are visable through arcuate diametrically opposed openings 83' and 84' extending through the front wall 27 of the casing, similar to the observation openings 83 and 84. In the chlorine testing side, a container, similar to the container 17 and having a fresh supply of the liquid to be tested is deposited in the compartment 16 so that the liquid is visible through the observation opening 57. A reactive reagent (Ortho-tolidin) is added in predetermined quantities to the pool water to be tested which reacts with the pool water to change the normally clear color of the pool water into a variety of shades of yellow to be compared with color keys 20 of varied values to determine the chlorine content of the testing water.

As best seen in FIGURE 6, the indica 81' include instruction legends varying from "ideal" to "excess chlorine" with intermediate instructions such as "min. cl.," "max. cl.," and "add cl." and "excess cl.," and visible through the observation openings 84' when the color wheel 18 is rotated to align a color key 20 with the observation opening 64 to correspond with the color of the tested water to be tested and having the reagent added thereto and simultaneously visible through the observation opening 57. Standard values, corresponding to the colors of the color keys 20 are provided in the indicia means 82' and visible through observation opening 83', these values, and instructions being aligned automatically with their respective observation openings when a color key 20 most closely corresponding to the color of the liquid being tested is aligned with the observation opening 64.

An important feature of this invention is the provision for more easily and readily removing color keys like 19 and 20 from their respective sockets like 67 for replacement thereof in the event that other tests are desired to be performed by the device 10 or, in the event that other values are desired to be substituted for the values contained therein. For example, in various communities, the standards required for various tests vary appreciably, wherein particular color keys acceptable in one community are not acceptable in others. In such event, it is more convenient to change or replace the color keys instead of changing the entire device or require a plurality of such devices. In accordance with this invention, one or more color keys may be removed from a color wheel and others substituted therefor or rearranged until the color keys match the instructions of the indicia 81 and the regulations as needed. The structure of the instruction indicia 81, 81' and the numerical value indicia 82 and 82' are preferably formed on removable and replaceable labels, such as labels having pressure sensitive adhesive on the back thereof whereby indica may be easily removed from the cover plates 66 and replaced by other suitable indicia. In this manner, the color wheels are completely versatile in their use by providing key and indicia means which are removable, replaceable, and interchangeable.

Figure 7:
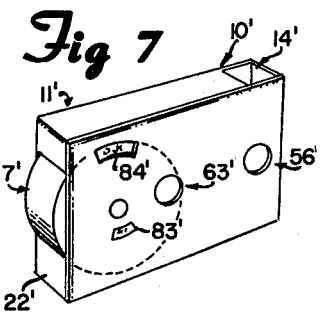
FIGURE 7 is a perspective view, in elevation, of a modified embodiment of the comparator of this invention.

A modified embodiment of this invention is illustrated in FIGURE 7 and generally indicated by the numeral 10' and wherein parts similar to parts of the first embodiment are indicated by like numbers which are primed.

In the embodiment 10' of FIGURE 7, a color comparator useable for conducting one test at a time is shown and having, rotatably mounted in its casing 11', a single color wheel, such as the wheel 17' having its periphery extending outwardly through one of the outer walls of the casing level such as the end wall 22' so as to be engageable by a finger of the user for rotating the color wheel. Depending on the test to be conducted therewith, the color wheel is provided having color keys and indicia appropriate to the test.

Further, in the instant embodiment, the casing 11' is provided with a single, relatively-narrow compartment 14' for supporting a single container like 17, an observation opening 56' for observing the liquid being tested and residing in the compartment 14', an observation opening 63' suitable for viewing the color keys of the color wheel 17' so as to align the color key most nearly corresponding to the color of the liquid being tested, and observation openings 84' and 83' for observing the instructions of indicia like the indicia 81 and numerical values like the numerical values of the indicia 82, respectively, therethrough.

While there is herein shown and described what is conceived to be the most practical and preferred embodiments of this invention, it is recognized that departures may be made therefrom within the scope of this invention which is not limited to the details disclosed herein but is to be accorded the full scope of the claims so as to embrace any and all equivalent devices.

What is claimed as new and desired to secure by Letters Patent is:

1. A color comparator comprising:
   a walled casing of light-excluding material having a back wall, top and bottom walls, a pair of end walls, partition means substantially parallel to said end walls and spaced therefrom so as to define at least a pair of vertical compartments, an opening in said top wall above one of said compartments and a front wall removably secured so as to close said compartments, said one of said compartments being adapted to receive a transparent liquid container therein;
   a cylinder mounted in the other of said compartments for rotation about an axis extending transversely therethrough and having a plurality of circumferentially spaced color keys; an opening in a portion of said casing defining said other compartment for providing access to said cylinder to rotate same,
   a first observation opening extending through the front and back wall portions of said one of said compartments of said casing and through which the liquid in a container residing therein is observable; and
   a second observation opening extending through the front and back walls of said other of said compartments of said casing and through which one of said keys of said cylinder is observable as said cylinder is rotated on said axis to align a key therewith and for comparison with the liquid,
   a first indicia means having a plurality of first indicia arranged circumferentially on said cylinder, each indicium indicating a potential condition of the liquid observable through said first observation opening;
   second indicia means having a plurality of second indicia circumferentially arranged on said cylinder in predetermined spaced relation to said first indicia means, each second indicium indicating an instruction corresponding to a condition of the liquid observed through said first observation opening in response to rotation of said cylinder into a position wherein a color key most closely corresponding to the color of the liquid is observable through said first observation opening;
   a pair of diametrically opposed, discrete openings extending through said front wall and aligned with said first and second indicia means for viewing thereof, so as to visually determine the condition of the liquid,
   said cylinder including a plurality of circumferentially spaced cylindrical sockets having their longitudinal axes substantially parallel to the axis of rotation of said cylinder and wherein each of said color keys includes a cup-shaped body of transparent, colorless material disposed in one of said sockets and having a closure of similar material closing its open end, means having a preselected color and intensity of said color contained in said body, each of said color keys representing a preselected standard color comparable to said liquid for determining the condition thereof,
   said cylinder including a cup-shaped member having a back wall and an annular wall integral therewith surrounding said sockets and having an annular recess adjacent to its open end; and
   a closure member detachably fitting in said recess, said closure member including said first and second indicia means on the outer surface thereof in radially spaced and substantially concentric relationship to the axis of rotation of said cylinder so as to be observable through one of said discrete observation openings and a plurality of apertures in said back wall and said closure member and aligned with said sockets.

2. A color comparator as defined in claim 1, including key means keying said closure member in non-rotatable relationship to said annular wall of said cylinder.

References Cited by the Examiner
UNITED STATES PATENTS

| | | | |
|---|---|---|---|
| 1,616,092 | 2/27 | Stirlen | 88—14 |
| 1,675,967 | 7/28 | Zitkowski | 88—14 |
| 1,806,806 | 5/31 | Kocour | 88—14 |
| 1,976,672 | 10/34 | Peet | 88—14 |
| 2,341,810 | 2/44 | Peet | 88—14 |
| 2,489,723 | 11/49 | Resnick | 88—14 |
| 2,672,756 | 3/54 | White | 88—14 |

JEWELL H. PEDERSEN, *Primary Examiner.*